United States Patent
Dinc et al.

(10) Patent No.: US 6,302,646 B1
(45) Date of Patent: Oct. 16, 2001

(54) ROTARY MACHINE CONTAINING A BRUSH SEAL

(75) Inventors: Osman Saim Dinc, Troy, NY (US); Robert Joseph Albers, Park Hills, KY (US); Yahya Dogu, Yahsihan-Kirikkale (TR); Ming Zhou, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/461,895

(22) Filed: Dec. 15, 1999

(51) Int. Cl.[7] .................................................. F04D 29/08
(52) U.S. Cl. ........................................ 415/174.2; 415/230
(58) Field of Search ............................... 415/174.2, 173.3, 415/173.5, 174.5, 174.3, 230, 231; 277/355

(56) References Cited

U.S. PATENT DOCUMENTS

| | | | |
|---|---|---|---|
| 5,192,084 | * | 3/1993 | Norbury ................................. 277/53 |
| 5,400,952 | * | 3/1995 | Hetico et al. ......................... 228/185 |
| 5,961,280 | * | 10/1999 | Turnquist et al. ................. 415/173.3 |
| 5,971,400 | | 10/1999 | Turnquist et al. ................... 277/416 |
| 6,010,132 | * | 1/2000 | Bagepalli et al. ..................... 277/53 |
| 6,139,019 | * | 10/2000 | Dinc et al. .......................... 277/355 |
| 6,168,377 | * | 1/2001 | Wolfe et al. ...................... 415/174.2 |
| 6,173,958 | * | 1/2001 | Dinc et al. .......................... 277/303 |

OTHER PUBLICATIONS

"Brush Seal Segment", filed Aug. 10, 1998, S.N. 09/131, 485.
"Seal Assembly and Rotary Machine Containing Such Seal", Jun. 8, 1999, S.N. 09/327,583.
Recently filed RD–27, 121/USA, "Brush Seal Segment Having Bristle Damping".
Recently filed RD–27,123/USA, "Brush Seal Segment With Bristle Damping."

* cited by examiner

*Primary Examiner*—Edward K. Look
*Assistant Examiner*—James M. McAleenan
(74) *Attorney, Agent, or Firm*—Patrick K. Patnode; Douglas E. Stoner

(57) ABSTRACT

A rotary machine has a rotor and a surrounding stator. The rotor has an outer surface with an upstream larger-radius first section, a downstream smaller-radius second section, and an intervening third section which has an area facing in a direction other than perpendicular or parallel to the axis of the rotor. In one example, the area includes a first convex area and a second concave area. The machine also has a first brush seal with bristles whose free ends are positioned near the second section, and the machine may also include a second brush seal with bristles whose free ends are positioned near the first section and with a front plate having a ledge projecting away from its corresponding bristles.

20 Claims, 2 Drawing Sheets

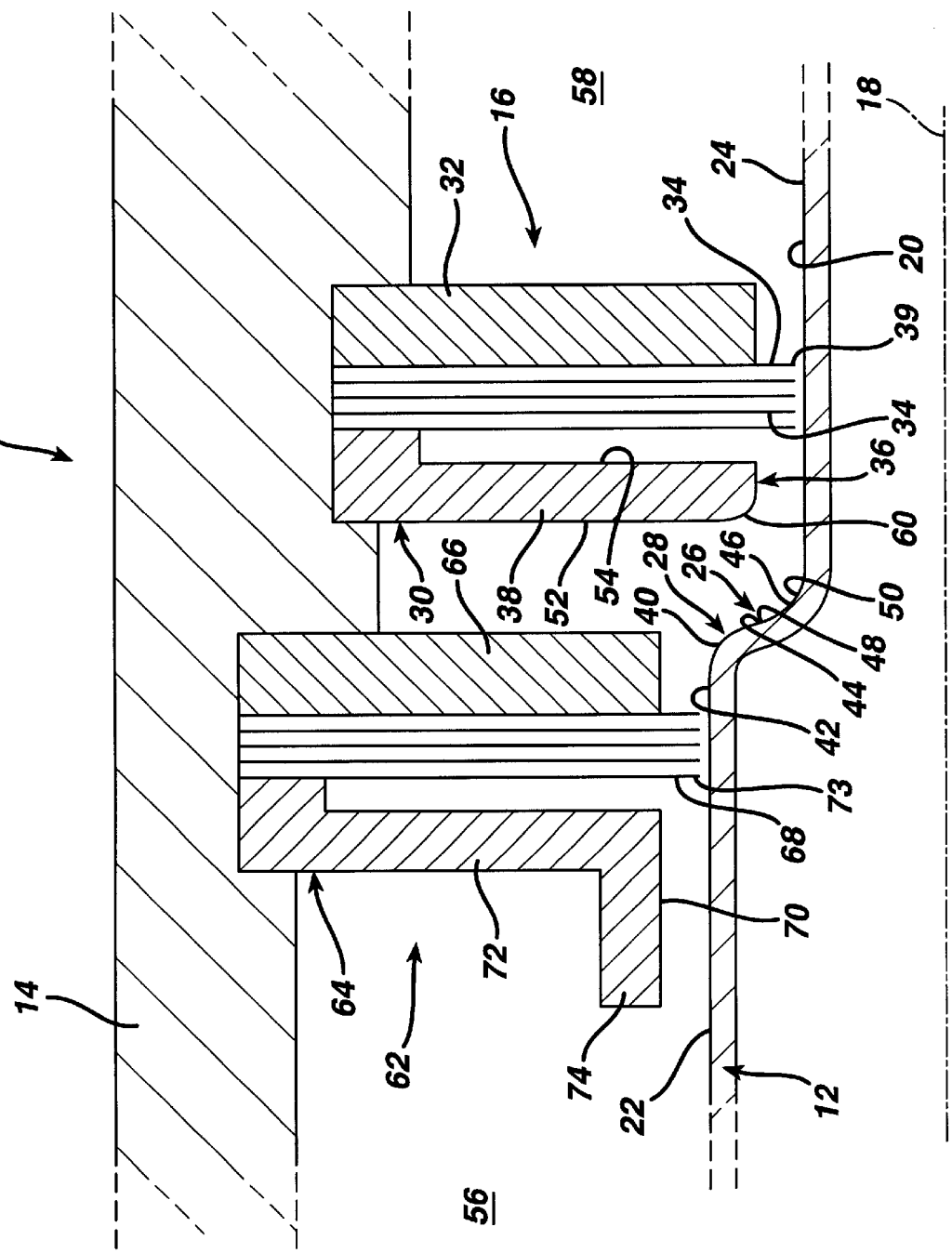

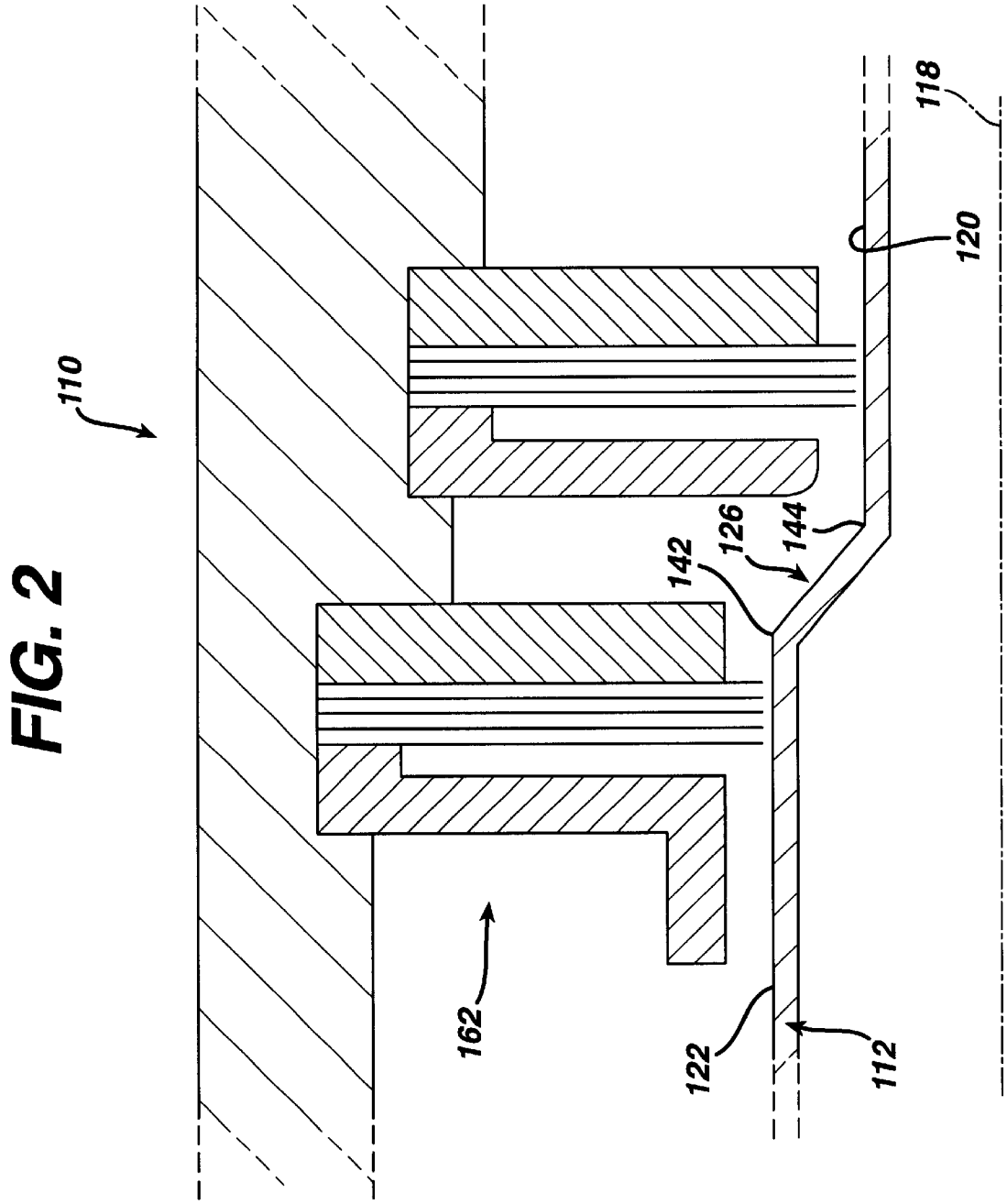

ROTARY MACHINE CONTAINING A BRUSH SEAL

BACKGROUND OF THE INVENTION

The present invention relates generally to rotary machines, and more particularly to a rotary machine having a brush seal.

Rotary machines include, without limitation, turbines for steam turbines and compressors and turbines for gas turbines. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

Annular brush seals have been proposed for use between a rotor and a surrounding casing in gas and steam turbines. The annular brush seal is made up of circumferentially-arrayed brush seal segments. Each brush seal segment is attached to the casing and includes a back (i.e., downstream) plate, a front (i.e., upstream) plate, and bristles which are positioned between the back and front plates with the free end of generally each bristle extending beyond the edges of the back and front plates. The bristles typically are canted at an angle of generally forty-five degrees in the direction of rotation of the rotor, and the free ends of the bristles are close to (and may even touch) the rotor. Typically, the front plate (and in some designs also portions of the back plate), near the free ends of the bristles, is spaced apart from the bristles to allow room for the bristles to flex and recover during transient encounters of the free ends of the bristles with the rotor.

Known rotary machine designs include a design having a stepped rotor, a first brush seal downstream of the step, and, in one example, a second brush seal upstream of the step. Applicants found that gas flow passing the step would swirl, and some of such flow would swirl between the front plate and the bristles of the first brush seal causing bristle flutter (i.e., instability) which quickly wore the bristles and lead to premature brush seal failure. Also, when there is turbulent gas flow upstream, some of such flow can swirl between the front plate and the bristles of the second brush seal causing bristle flutter which quickly wears the bristles leading to premature brush seal failure. What is needed is a design for a rotary machine which reduces bristle flutter in a brush seal located near a stepped area of the rotor.

BRIEF SUMMARY OF THE INVENTION

In a first expression of an embodiment of the invention, a rotary machine includes a rotor, a stator, and a first brush seal. The rotor has a longitudinal axis and an outer surface. The outer surface includes longitudinally extending first and second sections and a third section located longitudinally between, and connected to, the first and second sections. The first section is disposed upstream from the second section. The second section has a smaller radius than the first section, and the third section has at least one area located radially between the first and second sections and facing in a direction other than perpendicular or parallel to the axis. The stator circumferentially surrounds the rotor. The first brush seal is attached to the stator, has radially-inwardly-extending front and back plates, and has bristles positioned longitudinally between the back and front plates. The front plate has a radially inner edge and a portion extending to the edge with the portion longitudinally spaced apart from the bristles. The back plate is located longitudinally further downstream from the third section of the outer surface of the rotor than is the front plate, and the bristles have free ends positioned near the second section of the outer surface of the rotor.

In a second expression of an embodiment of the invention, a rotary machine includes a rotor, a stator, a first brush seal, and a second brush seal. The rotor has a longitudinal axis and an outer surface. The outer surface includes longitudinally extending first and second sections and a third section located longitudinally between, and connected to, the first and second sections. The first section is disposed upstream from the second section. The second section has a smaller radius than the first section, and the third section has at least one area located radially between the first and second sections and facing in a direction other than perpendicular or parallel to the axis. The stator circumferentially surrounds the rotor. The first brush seal is attached to the stator, has radially-inwardly-extending first front and first back plates, and has first bristles positioned longitudinally between the first back and first front plates. The first front plate has a first radially inner edge and a first portion extending to the edge with the first portion longitudinally spaced apart from the first bristles. The first back plate is located longitudinally further from the third section of the outer surface of the rotor than is the first front plate, and the first bristles have first free ends positioned near the second section of the outer surface of the rotor. The second brush seal is attached to the stator, has radially-inwardly-extending second front and second back plates, and has second bristles positioned longitudinally between the second back and second front plates. The second front plate has a second radially inner edge and a second portion extending to the edge with the second portion longitudinally spaced apart from the second bristles. The second front plate is located longitudinally further upstream from the second section of the outer surface of the rotor than is the second back plate, and the second bristles have second free ends positioned near the first section of the outer surface of the rotor. The second portion of the second front plate at the second radially inner edge has a ledge projecting generally away from the second bristles.

Several benefits and advantages are derived from the invention. In the first and second expressions of an embodiment of the invention, as shown by engineering analysis, the shape of the third section of the outer surface of the rotor (which acts to smooth the radial gap between the first and second sections of the outer surface of the rotor) reduces swirl in the gas flow approaching the first brush seal. This reduces swirl between the first front plate and the first bristles which reduces bristle flutter resulting in less bristle wear and increased seal life for the first brush seal. In the second expression of an embodiment of the invention, as shown by engineering analysis, the ledge of the second portion of the second front plate of the second brush seal acts to channelize gas flow reducing swirl in any turbulent gas flow found upstream near the first brush seal. This reduces swirl between the second front plate and the second bristles which reduces bristle flutter resulting in less bristle wear and increased seal life for the second brush seal.

BRIEF DESCRIPTION OF THE DRAWINGS

FIG. 1 is a schematic, cross-sectional, above-axis, side view of an embodiment of the rotary machine of the invention, wherein the cross section is taken by a cutting plane, and wherein the longitudinal axis of the rotor of the rotary machine lies in the cutting plane; and FIG. 2 is a view, as in FIG. 1, but of a different embodiment of the rotary machine of the invention.

DETAILED DESCRIPTION OF THE INVENTION

Referring now to the drawings, FIG. 1 schematically shows an embodiment of the rotary machine 10 of the present invention. It is noted that only a portion of the rotary machine 10 is shown in the figure. In one example, the rotary machine is an aircraft gas turbine engine. However, the invention is not so limited, and the invention is applicable to other rotary machines including, without limitation, gas and steam turbines used to turn electrical generators for power utility companies.

In a first expression of the embodiment of the invention shown in FIG. 1, a rotary machine 10 includes a rotor 12, a stator 14, and a first brush seal 16. The rotor 12 has a longitudinally extending axis 18 and an outer surface 20. The outer surface 20 includes generally longitudinally extending first and second sections 22 and 24 and further includes a third section 26 disposed longitudinally between, and connected to, the first and second sections 22 and 24. The first section 22 is disposed upstream from the second section 24. The first section 22 has a generally constant first radius (measured from the longitudinal axis 18), and the second section 24 has a generally constant second radius (measured from the longitudinal axis 18) which is smaller than the first radius. The third section 26 has at least one area 28 disposed radially between the first and second radii and facing in a direction other than perpendicular or parallel to the axis 18. The stator 14 is generally coaxially aligned with the axis 18 and circumferentially surrounds, and is radially spaced apart from, the rotor 12. The first brush seal 16 is attached to the stator 14. The first brush seal 16 has radially-inwardly-extending (first) front and back plates 30 and 32 and further has a plurality of (first) bristles 34 disposed longitudinally between the back and front plates 32 and 30. The front plate 30 has a (first) radially inner edge 36 and further has a (first) portion 38 extending to the radially inner edge 36, with the portion 38 longitudinally spaced apart from the bristles 34. The back plate 32 is disposed longitudinally further downstream from the third section 26 of the outer surface 20 of the rotor 12 than is the front plate 30. The bristles 34 have (first) free ends 39 disposed proximate the second section 24 of the outer surface 20 of the rotor 12.

In one design, the third section 26 is radially contained entirely inward of the first radius, and in another design, the third section 26 is radially contained entirely outward of the second radius. In one construction, as seen in FIG. 1, the at-least-one area 28 of the third section 26 of the outer surface 20 the rotor 12 includes a first area 40 which appears as a convex arc in an above-axis, cross-sectional view taken by a cutting plane, wherein the axis 18 (i.e., the longitudinal axis of the rotor) lies in the cutting plane. The convex arc has a first end 42 connected to the first section 22 of the outer surface 20 of the rotor 12 and a second end 44 disposed closer to the axis 18 than is the first end 42 of the convex arc.

In one extension of this construction, as seen in FIG. 1, the at-least-one area 28 of the third section 26 of the outer surface 20 of the rotor 12 includes a second area 46 which appears as a concave arc in the previously-described above-axis, cross-sectional view. Here, the concave arc has a first end 48 connected to the second end 44 of the convex arc and further has a second end 50 connected to the second section 24 of the outer surface 20 of the rotor 12. In another expression of such construction, as seen in FIG. 1, the at-least-one area 28 of the third section 26 of the outer surface 20 of the rotor 12 includes a second area 46 which appears as a concave arc in the previously-described above-axis, cross-sectional view. Here, the concave arc has first and second ends 48 and 50 with the first end 48 disposed further from the axis 18 (i.e., the longitudinal axis of the rotor) than is the second end 50 and with the second end 50 connected to the second section 24 of the outer surface 20 of the rotor 12. It is noted that, compared to known rotary machine designs having stepped-rotors, the convex and/or concave shape of the third section 26 of the outer surface 20 of the rotor 12 (which acts to smooth the radial gap between the first and second sections 22 and 24 of the outer surface 20 of the rotor 12) reduces swirl in the gas flow approaching the first brush seal 16. This reduces swirl between the front plate 30 and the bristles 34 which reduces bristle flutter resulting in less bristle wear and increased seal life for the first brush seal 16.

In one example, the front plate 30 has a generally planar front face 52 oriented generally perpendicular to the axis 18 and facing away from the bristles 34. The front plate 30 also has a generally planar back face 54 oriented generally perpendicular to the axis 18 and facing towards the bristles 34. It is noted that the front face 52 faces upstream towards a higher pressure area 56 and that the back face 54 faces downstream towards a lower pressure area 58 with the direction of gas flow being from the higher pressure area 56 to the lower pressure area 58. The radially inner edge 36 of the front plate 30 connects the front and back faces 52 and 54. The radially inner edge 36 has a convex surface portion 60 extending from the front face 52 longitudinally towards (but not necessarily reaching) the back face 54 and radially inward toward the axis 18. It is noted that the convex surface portion 60 further reduces swirl in the gas flow approaching the first brush seal 16.

A different embodiment of the rotary machine 110 of the invention is shown in FIG. 2. The rotary machine 110 of FIG. 2 is seen to be almost identical with the previously-described embodiment of the rotary machine 10 of FIG. 1. The one difference, as seen in FIG. 2, is that the third section 126 of the outer surface 120 of the rotor 112 has a different shape and appears as a straight line in an above-axis, cross-sectional view taken by a cutting plane, wherein the longitudinal axis 118 of the rotor 112 lies in the cutting plane, and wherein the straight line has a first end 142 connected to the first section 122 of the outer surface 120 of the rotor 112 and has a second end 144 disposed closer to the axis 118 than is the first end 142.

In a second expression of the embodiment of the invention shown in FIG. 1, a rotary machine 10 includes the rotor 12, the stator 14, and the first brush seal 16 as previously described in the first expression of the embodiment of the invention shown in FIG. 1. The previously-described front plate 30, back plate 32, bristles 34, radially inner edge 36, portion 38, and free ends 39 of the first brush seal 16 are herein denominated as first front plate 30, first back plate 32, first bristles 34, first radially inner edge 36, first portion 38, and first free ends 39 in the second expression of the embodiment of the invention shown in FIG. 1. In the second expression, the rotary machine 10 additionally includes a second brush seal 62 which is attached to the stator 14. The second brush seal 62 has radially-inwardly-extending second front and back plates 64 and 66 and further has a plurality of second bristles 68 disposed longitudinally between the second back and front plates 66 and 64. The second front plate 64 has a second radially inner edge 70 and further has a second portion 72 extending to the second radially edge 70, with the second portion 72 longitudinally spaced apart from the second bristles 68. The second front plate 64 is disposed longitudinally further upstream from the second section 24 of the outer surface 20 of the rotor 12 than is the second back plate 66. The second bristles 68 have second free ends 73 disposed proximate the first section 22 of the outer surface 20 of the rotor 12. The second portion 72 of the second front plate 64, at the second radially inner edge 70 of the second front plate 64, has a ledge 74 projecting generally away from the second bristles 68.

In one design, the second back plate 66 at least partially longitudinally overlaps the third section 28 of the outer surface 20 of the rotor 12. In another design, the second portion 72 of the second front plate 64 has a thickness along a direction parallel to the axis 18, wherein the thickness of the ledge 74 of the second portion 72 of the second front plate 64 is greater than twice the thickness (along the same previously-described direction) of any other part of the second portion 72 of the second front plate 64. A longer ledge 74 will channelize a turbulent gas flow reducing unwanted bristle flutter in the second bristles 68 of the second brush seal 62. It is noted that, in one example, the previously-described different embodiment of the rotary machine 110 shown in FIG. 2 additionally includes a second brush seal 162 generally identical to the second brush seal 62 above-described in the second expression of the embodiment of the invention shown in FIG. 1.

For either expression or embodiment, in one construction, the first (and second) brush seal is an annular seal defined by an array of circumferentially-arrayed annular brush seal segments, wherein a brush seal segment has only one front plate which is a manually-rigid front plate. By "manually-rigid" is meant that the front plate cannot be flexed by hand by an adult person of average strength. A single, rigid front plate is less prone to unwanted flutter in a turbulent gas flow and is less susceptible to damage during shipping and installation and during maintenance of nearby turbine components. In another construction (not shown), the portion of the front plate (which also can include the ledge of the second brush seal) includes through holes, wherein subflow through the through holes purges the space between the front plate and the bristles of unwanted swirl from the main flow, such purging also helping to decrease bristle flutter. In a further construction (not shown), a brush seal segment has several manually-flexible damper plates having through holes and being in contact with the front-most bristles. By "manually-flexible" is meant that the damper plates can be flexed by hand by an adult person of average strength. The damper plates replace, or are in addition to, the first and/or second portions 38 and 72 of the first and second front plates 30 and 64.

In any expression or embodiment of the invention, typically (but not necessarily), the bristles are each canted at a generally-identical angle with respect to a corresponding radius line extending outward (from the axis) to each of the bristles. Such bristle canting is not visible from the views shown in the Figures. In one example, the angle of the bristles is generally forty-five degrees. In a typical construction, the back plate and the front plate each are of monolithic construction and consist essentially of metal or metal alloy such as, but not limited to, stainless steel. The bristles typically consist essentially of metal-wire or ceramic-wire bristles such as, but not limited to, cobalt-based-alloy wire bristles. In one construction, metal-wire bristles are welded to the front and back plates. In one arrangement, the brush seals are attached to the stator by engagement of the brush seal segments with a slot the stator as shown in the Figures. The bristles have been described as being disposed proximate (and in one application disposed as to just touch) the rotor.

The foregoing description of several expressions and embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A rotary machine comprising:
   a) a rotor having a longitudinally extending axis and an outer surface, wherein said outer surface includes generally longitudinally extending first and second sections and a third section disposed longitudinally between and connected to said first and second sections, wherein said first section is disposed upstream from said second section, wherein said first section has a generally constant first radius, wherein said second section has a generally constant second radius which is smaller than said first radius, and wherein said third section has at least one area disposed radially between said first and second radii and facing in a direction other than perpendicular or parallel to said axis;
   b) a stator generally coaxially aligned with said axis and circumferentially surrounding and radially spaced apart from said rotor; and
   c) a first brush seal attached to said stator, having radially-inwardly-extending front and back plates and having a plurality of bristles disposed longitudinally between said back and front plates, wherein said front plate has a radially inner edge and a portion extending to said radially inner edge with said portion longitudinally spaced apart from said bristles, wherein said back plate is disposed longitudinally further downstream from said third section of said outer surface of said rotor than is said front plate, and wherein said bristles have free ends disposed proximate said second section of said outer surface of said rotor.

2. The rotary machine of claim 1, wherein said third section is radially contained entirely inward of said first radius.

3. The rotary machine of claim 2, wherein said third section is radially contained entirely outward of said second radius.

4. The rotary machine of claim 1, wherein said at-least-one area of said third section of said outer surface of said rotor appears as a straight line in an above-axis, cross-sectional view taken by a cutting plane, wherein said longitudinal axis lies in said cutting plane, and wherein said straight line has a first end connected to said first section of said outer surface of said rotor and a second end disposed closer to said axis than is said first end.

5. The rotary machine of claim 1, wherein said at-least-one area of said third section of said outer surface of said rotor includes a first area which appears as a convex arc in an above-axis, cross-sectional view taken by a cutting plane, wherein said longitudinal axis lies in said cutting plane, and wherein said convex arc has a first end connected to said first section of said outer surface of said rotor and a second end disposed closer to said axis than is said first end of said convex arc.

6. The rotary machine of claim 5, wherein said at-least-one area of said third section of said outer surface of said rotor includes a second area which appears as a concave arc in said above-axis, cross-sectional view, and wherein said concave arc has a first end connected to said second end of said convex arc and a second end connected to said second section of said outer surface of said rotor.

7. The rotary machine of claim 1, wherein said at-least-one area of said third section of said outer surface of said rotor includes a second area which appears as a concave arc in an above-axis, cross-sectional view taken by a cutting plane, wherein said longitudinal axis lies in said cutting plane, and wherein said concave arc has first and second ends with said first end disposed further from said axis than is said second end and with said second end connected to said second section of said outer surface of said rotor.

8. The rotary machine of claim 1, wherein said front plate has a generally planar front face oriented generally perpendicular to said axis and facing away from said bristles and a generally planar back face oriented generally perpendicular to said axis and facing towards said bristles, wherein said radially inner edge of said front plate connects said front and back faces, and wherein said radially inner edge has a convex surface portion extending from said front face longitudinally towards said back face and radially inward toward said axis.

9. The rotary machine of claim 8, wherein said at-least-one area of said third section of said outer surface of said rotor includes a first area which appears as a convex arc in an above-axis, cross-sectional view taken by a cutting plane, wherein said longitudinal axis lies in said cutting plane, and wherein said convex arc has a first end connected to said first section of said outer surface of said rotor and a second end disposed closer to said axis than is said first end of said convex arc.

10. The rotary machine of claim 9, wherein said at-least-one area of said third section of said outer surface of said rotor includes a second area which appears as a concave arc in said above-axis, cross-sectional view, and wherein said concave arc has a first end connected to said second end of said convex arc and a second end connected to said second section of said outer surface of said rotor.

11. A rotary machine comprising:
a) a rotor having a longitudinally extending axis and an outer surface, wherein said outer surface includes generally longitudinally extending first and second sections and a third section disposed longitudinally between and connected to said first and second sections, wherein said first section is disposed upstream from said second section, wherein said first section has a generally constant first radius, wherein said second section has a generally constant second radius which is smaller than said first radius, and wherein said third section has at least one area disposed radially between said first and second radii and facing in a direction other than perpendicular or parallel to said axis;
b) a stator generally coaxially aligned with said axis and circumferentially surrounding and radially spaced apart from said rotor;
c) a first brush seal attached to said stator, having radially-inwardly-extending first front and back plates and having a plurality of first bristles disposed longitudinally between said first back and front plates, wherein said first front plate has a first radially inner edge and a first portion extending to said first radially inner edge with said first portion longitudinally spaced apart from said first bristles, wherein said first back plate is disposed longitudinally further downstream from said third section of said outer surface of said rotor than is said first front plate, and wherein said first bristles have first free ends disposed proximate said second section of said outer surface of said rotor; and
d) a second brush seal attached to said stator, having radially-inwardly-extending second front and back plates and having a plurality of second bristles disposed longitudinally between said second back and front plates, wherein said second front plate has a second radially inner edge and a second portion extending to said second radially inner edge with said second portion longitudinally spaced apart from said second bristles, wherein said second front plate is disposed longitudinally further upstream from said second section of said outer surface of said rotor than is said second back plate, wherein said second bristles have second free ends disposed proximate said first section of said outer surface of said rotor, and wherein said second portion of said second front plate at said second radially inner edge of said second front plate has a ledge projecting generally away from said second bristles.

12. The rotary machine of claim 11, wherein said second back plate at least partially longitudinally overlaps said third section of said outer surface of said rotor.

13. The rotary machine of claim 11, wherein said second portion has a thickness along a direction parallel to said axis, and wherein said thickness of said ledge of said second portion of said second front plate is greater than twice said thickness of any other part of said second portion of said second front plate.

14. The rotary machine of claim 11, wherein said at-least-one area of said third section of said outer surface of said rotor appears as a straight line in an above-axis, cross-sectional view taken by a cutting plane, and wherein said longitudinal axis lies in said cutting plane, wherein said straight line has a first end connected to said first section of said outer surface of said rotor and a second end disposed closer to said axis than is said first end.

15. The rotary machine of claim 11, wherein said at-least-one area of said third section of said outer surface of said rotor includes a first area which appears as a convex arc in an above-axis, cross-sectional view taken by a cutting plane, wherein said longitudinal axis lies in said cutting plane, and wherein said convex arc has a first end connected to said first section of said outer surface of said rotor and a second end disposed closer to said axis than is said first end of said convex arc.

16. The rotary machine of claim 15, wherein said at-least-one area of said third section of said outer surface of said rotor includes a second area which appears as a concave arc in said above-axis, cross-sectional view, and wherein said concave arc has a first end connected to said second end of said convex arc and a second end connected to said second section of said outer surface of said rotor.

17. The rotary machine of claim 11, wherein said at-least-one area of said third section of said outer surface of said rotor includes a second area which appears as a concave arc in an above-axis, cross-sectional view taken by a cutting plane, wherein said longitudinal axis lies in said cutting plane, and wherein said concave arc has first and second ends with said first end disposed further from said axis than is said second end and with said second end connected to said second section of said rotor.

18. The rotary machine of claim 11, wherein said first front plate has a generally planar front face oriented generally perpendicular to said axis and facing away from said first bristles and a generally planar back face oriented generally perpendicular to said axis and facing towards said first bristles, wherein said radially inner edge of said first front plate connects said front and back faces, and wherein said first radially inner edge has a convex surface portion extending from said front face longitudinally towards said back face and radially inward toward said axis.

19. The rotary machine of claim 18, wherein said at-least-one area of said third section of said outer surface of said rotor includes a first area which appears as a convex arc in an above-axis, cross-sectional view taken by a cutting plane, wherein said longitudinal axis lies in said cutting plane, and wherein said convex arc has a first end connected to said first section of said outer surface of said rotor and a second end disposed closer to said axis than is said first end of said convex arc.

20. The rotary machine of claim 19, wherein said at-least-one area of said third section of said outer surface of said rotor includes a second area which appears as a concave arc in said above-axis, cross-sectional view, and wherein said concave arc has a first end connected to said second end of said convex arc and a second end connected to said second section of said outer surface of said rotor.

* * * * *